(12) United States Patent
Jolley et al.

(10) Patent No.: US 8,673,106 B1
(45) Date of Patent: Mar. 18, 2014

(54) METHODS AND APPARATUS FOR FORMING MOLDED THERMAL PLASTIC POLYMER COMPONENTS

(75) Inventors: Mark W. Jolley, Smithfield, UT (US); James Hedgecock, Carlsbad, CA (US)

(73) Assignee: Bounce Composites, LLC, Oceanside, CA (US)

( * ) Notice: Subject to any disclaimer, the term of this patent is extended or adjusted under 35 U.S.C. 154(b) by 0 days.

(21) Appl. No.: 12/946,816

(22) Filed: Nov. 15, 2010

Related U.S. Application Data

(60) Provisional application No. 61/307,936, filed on Feb. 25, 2010, provisional application No. 61/261,193, filed on Nov. 13, 2009.

(51) Int. Cl.

| | |
|---|---|
| B29C 65/00 | (2006.01) |
| B32B 37/00 | (2006.01) |
| B29C 45/00 | (2006.01) |
| B29C 47/00 | (2006.01) |
| B29C 43/02 | (2006.01) |
| B29C 49/00 | (2006.01) |
| B29C 51/00 | (2006.01) |
| B29D 24/00 | (2006.01) |
| B29D 29/00 | (2006.01) |
| B29B 15/00 | (2006.01) |
| B29C 39/14 | (2006.01) |
| B29C 49/08 | (2006.01) |
| B29C 55/00 | (2006.01) |
| B29C 67/20 | (2006.01) |
| B29D 7/00 | (2006.01) |
| B29C 43/10 | (2006.01) |
| B28B 21/36 | (2006.01) |
| A01J 21/00 | (2006.01) |
| A01J 25/12 | (2006.01) |
| A21C 3/00 | (2006.01) |
| A21C 11/00 | (2006.01) |
| A23G 1/20 | (2006.01) |
| A23G 3/02 | (2006.01) |
| A23P 1/00 | (2006.01) |
| B28B 11/08 | (2006.01) |
| B29C 55/28 | (2006.01) |

(52) U.S. Cl.
USPC ............ 156/285; 156/286; 156/382; 264/511; 264/553; 264/566; 264/568; 264/571; 425/504; 425/388

(58) Field of Classification Search
USPC ............ 156/228, 285, 286, 382; 264/87, 511, 264/526, 553, 566, 568, 571; 425/504, 388, 425/405.1, 405.2
See application file for complete search history.

(56) References Cited

U.S. PATENT DOCUMENTS

| | | | | |
|---|---|---|---|---|
| 2,377,317 | A * | 6/1945 | Blume | 428/428 |
| 5,534,203 | A * | 7/1996 | Nelson et al. | 264/101 |
| 6,212,838 | B1 * | 4/2001 | Eda | 52/403.1 |
| 6,869,561 | B2 * | 3/2005 | Johnson et al. | 264/510 |
| 2002/0069962 | A1 * | 6/2002 | Maxwell et al. | 156/286 |
| 2003/0059490 | A1 * | 3/2003 | Moore, Jr. | 425/2 |
| 2003/0219578 | A1 * | 11/2003 | Jones et al. | 428/292.1 |
| 2008/0061470 | A1 * | 3/2008 | Borchert et al. | 264/250 |

* cited by examiner

*Primary Examiner* — Christopher Schatz
*Assistant Examiner* — Matthew Hoover
(74) *Attorney, Agent, or Firm* — Fitch, Even, Tabin & Flannery LLP

(57) ABSTRACT

Apparatus and methods of forming a molded thermoplastic piece are provided. The molded thermoplastic piece can have an outer layer of one or more sheets of reinforced flexible thermoplastic and a porous layer, such as cork. The outer layer can a mechanical bond with the porous layer.

17 Claims, 11 Drawing Sheets

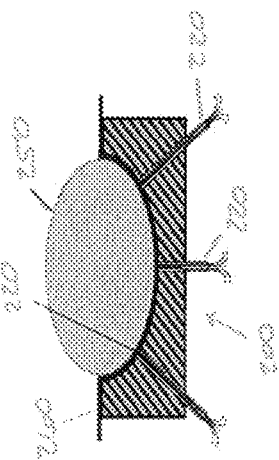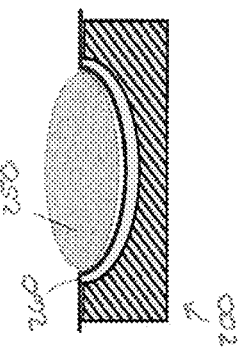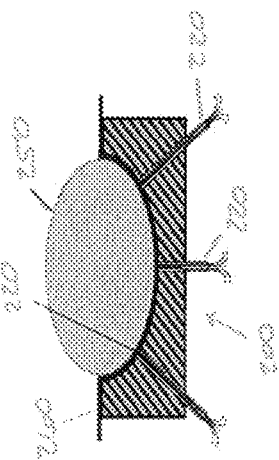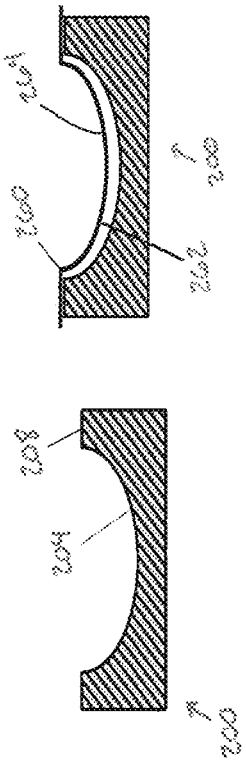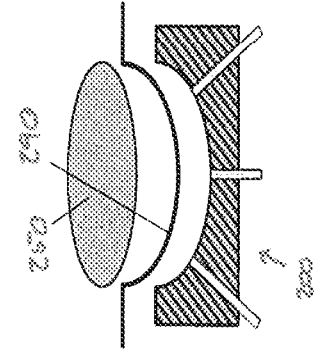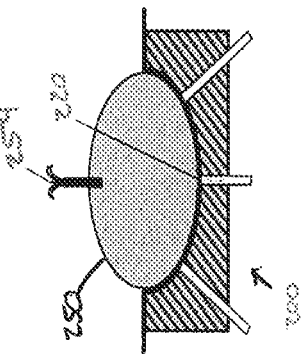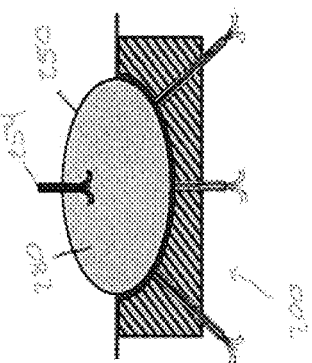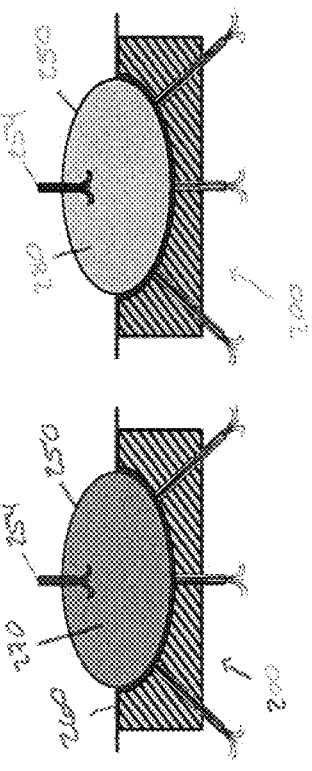

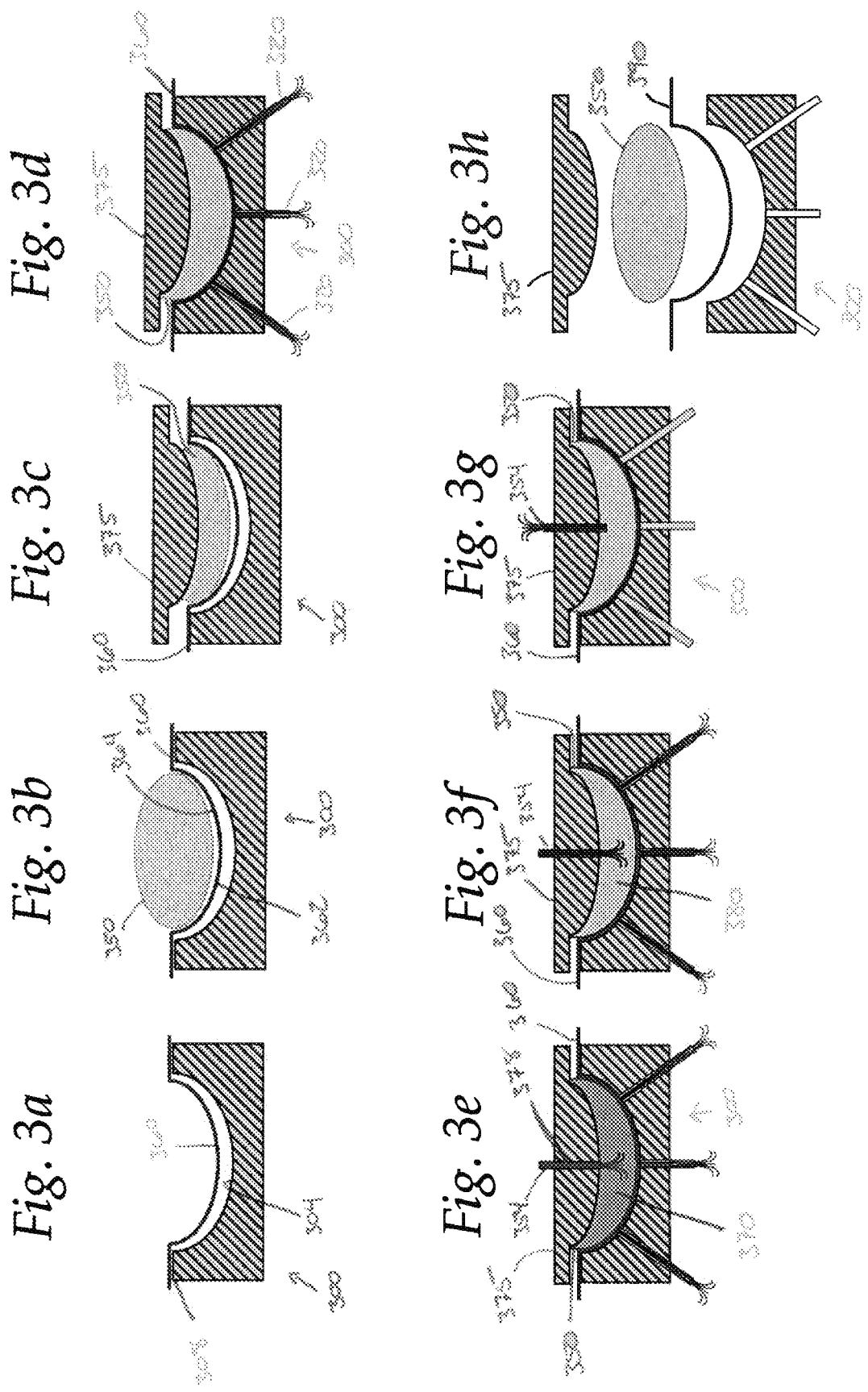

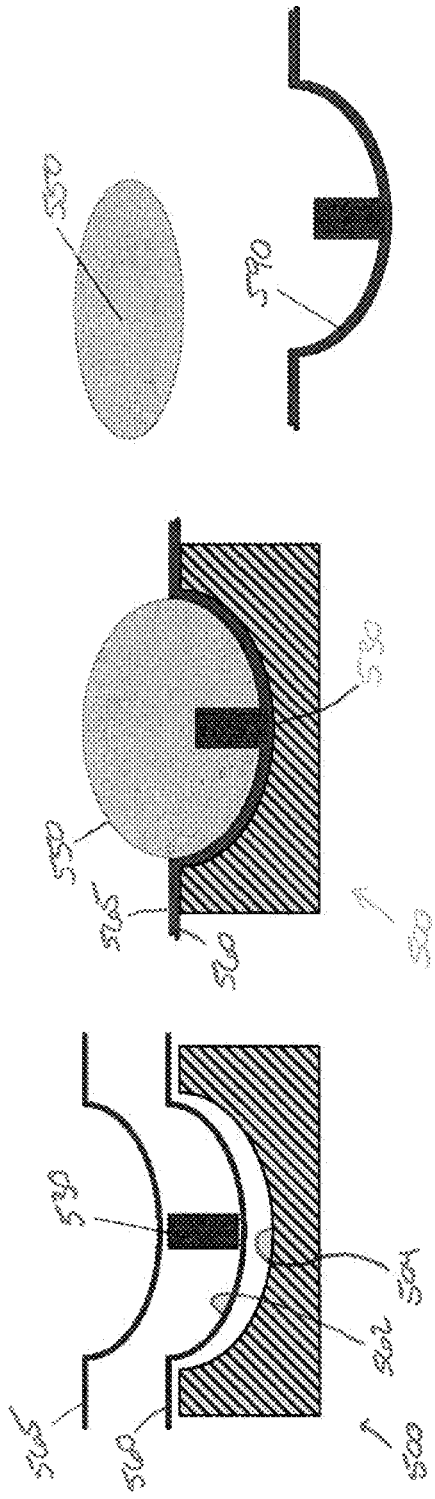

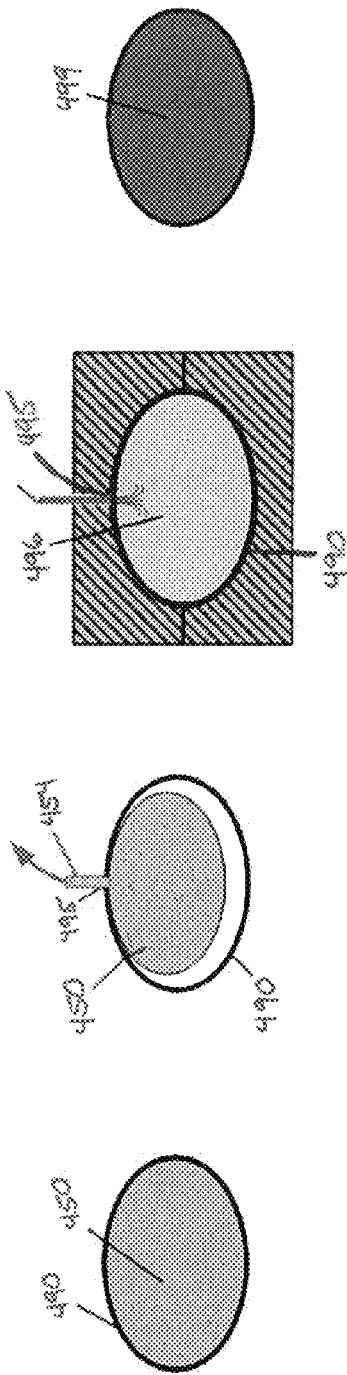

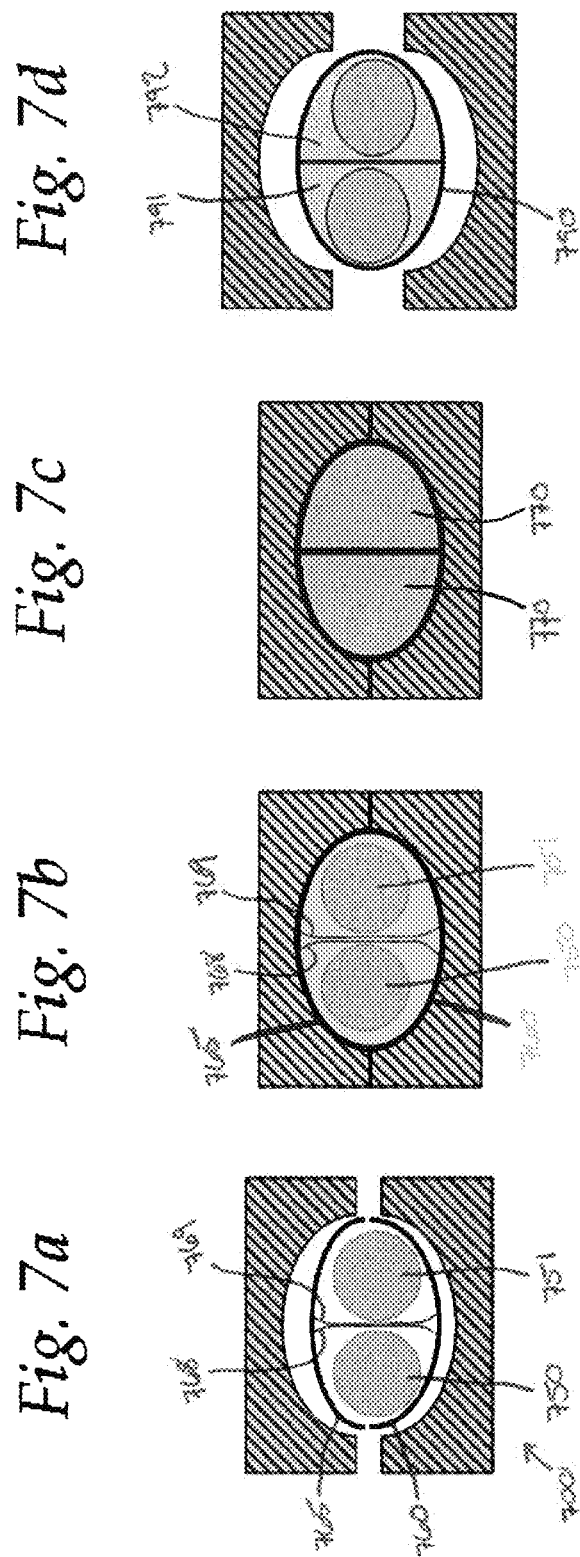

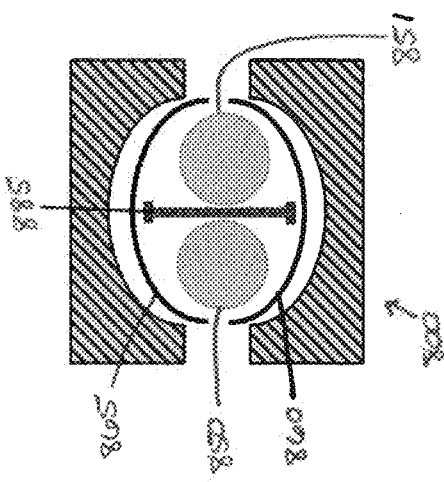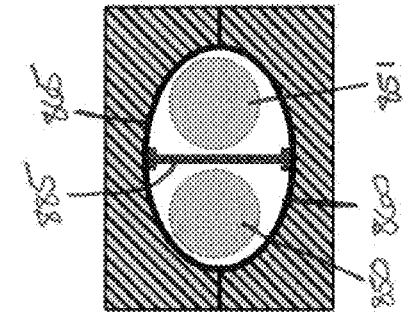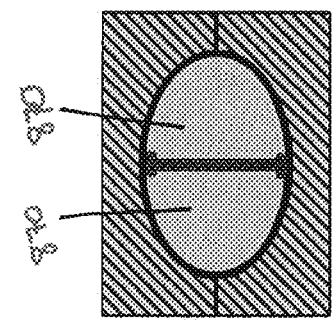

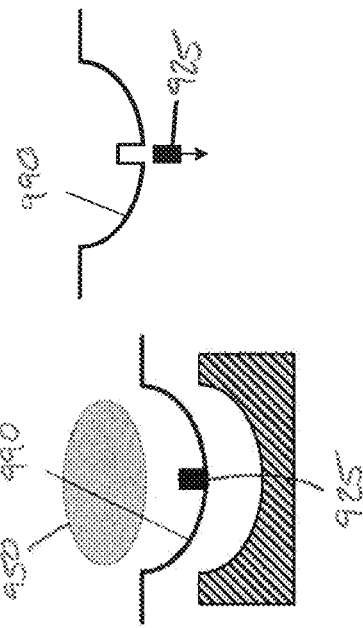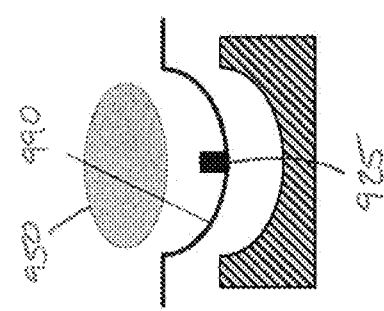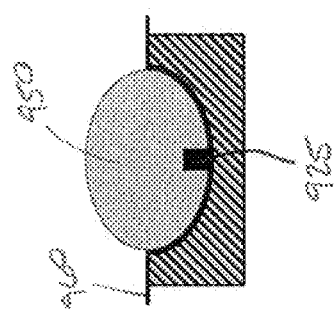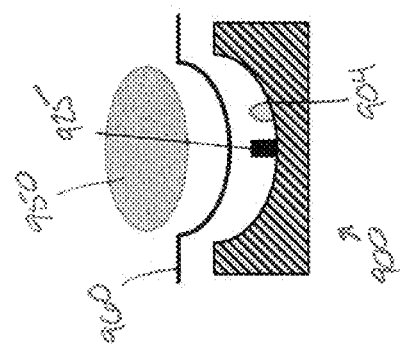

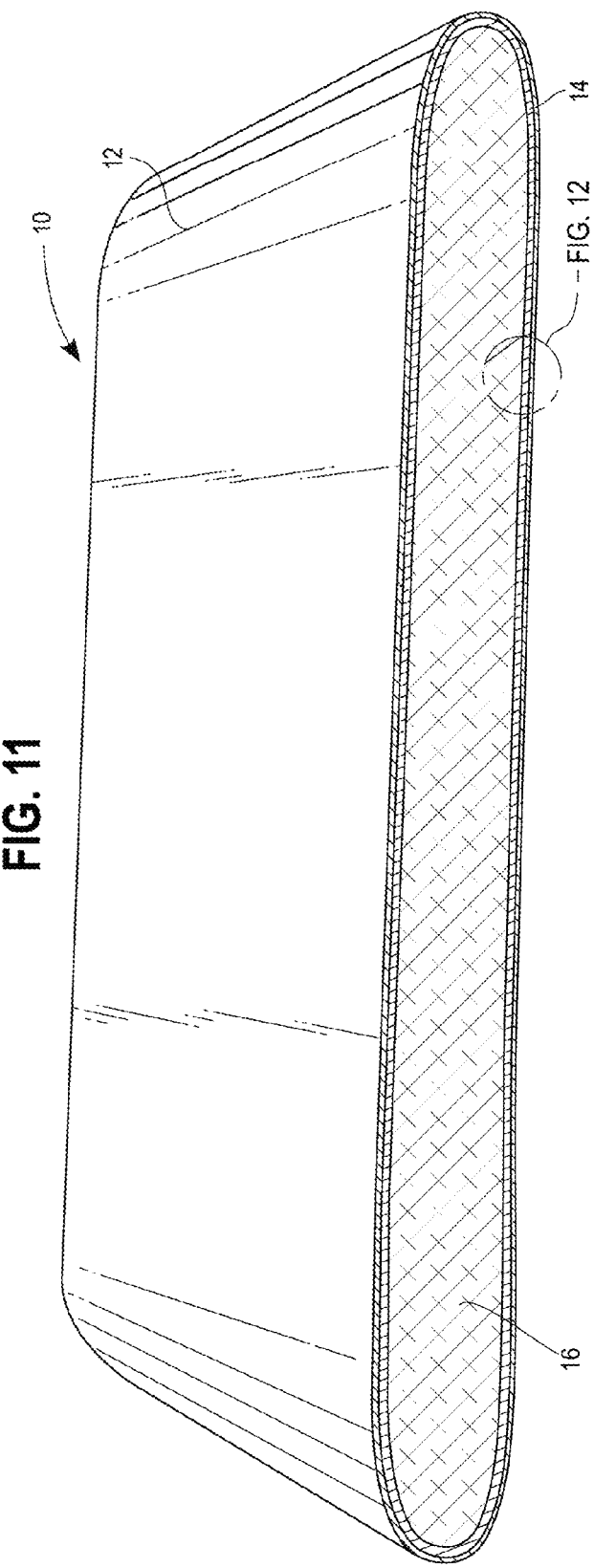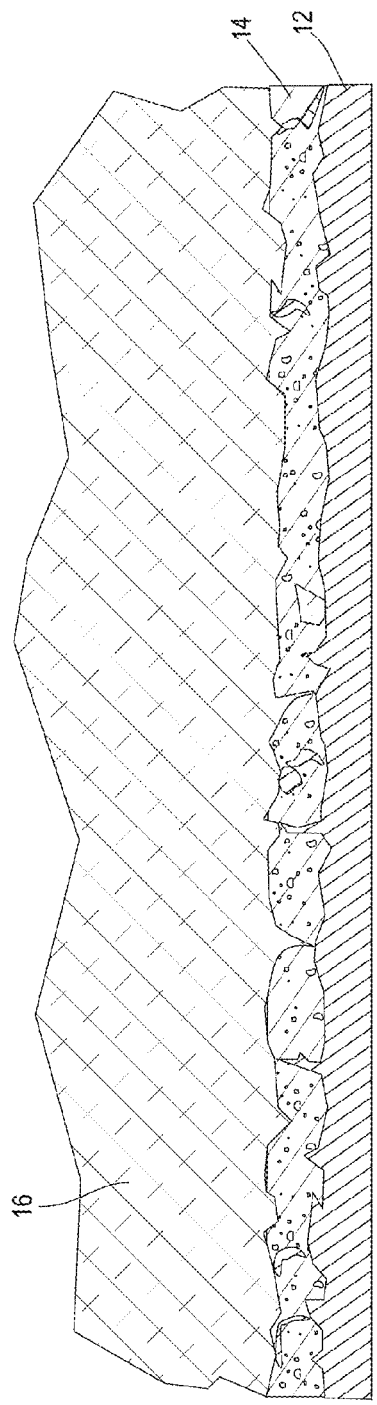

METHODS AND APPARATUS FOR FORMING MOLDED THERMAL PLASTIC POLYMER COMPONENTS

CROSS-REFERENCE TO RELATED APPLICATIONS

This application claims the benefit of U.S. Provisional Appl. Nos. 61/261,193, filed Nov. 13, 2009, and 61/307,936, filed Feb. 25, 2010, both of which are hereby incorporated by reference in their entireties.

FIELD

This disclosure relates generally to thermoplastic composite components and methods and apparatus for the formation of thermoplastic composite components.

BACKGROUND

Composite materials have matured over the years since the inception of glass reinforced thermoset materials to the advent of thermoplastic reinforced material. Thermoplastic materials can provide unique advantages over thermoset materials. Thermoplastics do not require a chemical reaction to form the structural part. For example, in the formation of thermoplastic materials the undesirable release of Volatile Organic Compounds (VOCs) associated forming thermoset materials can be avoided. However, composite or reinforced thermoplastic components cannot simply be formed using common injection molding or rotomolding techniques due to the presence of the reinforcing materials. As discussed below, efforts have been made to heat the molds in order to in turn heat the thermoplastic materials to permit them to be shaped to the mold. The heating of the molds themselves and, in particular, metal tooling, can require a high degree of heat to be applied as well as a large amount of time for the tooling to be brought up to the desired temperature. The result is that such techniques can be costly, requiring a high degree of energy and a long cycle time, and result in increased cost for the components.

Much development has gone into the impregnation of a thermoplastic in combination with a fiberglass or other reinforcing fiber wherein a material can be made that achieves similar strength and flex modules to traditional fiber reinforced thermoset products. Such materials can be used in numerous applications, for example, from aviation to race cars to "bullet proof" materials. Numerous manufacturers have developed a combination of plastic and or other reinforcing articles that can than be formed or shaped into the final product. One such thermoformed material is described in U.S. Application Ser. No. 61/151,811, filed Feb. 11, 2009, incorporated herein by reference in its entirety. Another such material is available from Owens Corning, a manufacturer who produces a thermoformed product commonly known within the industry as TWINTEX. These materials can be provided in numerous configurations and densities. One type would be a comingled roving which may be woven in to a desired pattern or cloth type. Alternatively, the comingled roving may be provided in a random pattern. Another type of thermoplastic reinforced material, such as POLYSTRAND, is one where the plastic is laminated to the fibers and where the reinforcement is co-laminated as the thermoplastic is extruded to provide for a sheet-type material which can than be formed into a final product.

While these materials can be useful in certain applications, challenges and limitations exist due to difficulties encountered when trying to form or mold such materials, including using the above-described techniques as well as those described below.

One such method is filament winding. This is a traditional method used by manufacturers who utilizing a reinforced polymer with a long-strand fiber typically an E- or S-type fiberglass intermingled with the thermoplastic which is then sent through an oven where the material is heated beyond the forming temperature of the material then it is wound around a mandrel and cooled to the desired temperature.

Another method is known as thermoforming stamping and press molding. For example, this method is traditionally used with the fiber and thermoplastic has been consolidated into a sheet for such as is typical with a POLYSTRAND type material provided by Polystrand, Inc. of Montrose, Colo. The desired amount of consolidated sheets are stacked and clamped into a carrier device which than goes into an oven that would typically use infrared or other types of heating methods to bring the thermoplastics within the structure up to their forming temperature. The material is then moved into the forming station where it can be formed by the use of vacuum. In another form of this method, a top and bottom press or platens are used to physically push the material into the desired form which is then cooled. Core materials may be incorporated using this type of forming. These cores can be used to create a sandwich structure.

Vacuum molding is another method that may be used and typically is used when forming larger more complex shapes. The thermoplastic material is typically woven into a mat form and positioned onto a mold. The material is selected and/or layered in such a manner as to achieve the desired thicknesses and properties. A vacuum bag is placed over the material and mold and sealed to the surface. A vacuum is then applied after which the entire mold is heated beyond the forming temperature to shape the material. The mold is then cooled below the forming temperature to allow the thermoplastic material to cool back to a solid state.

Another method of forming thermoplastic materials is direct compression and injection. In this method, the reinforcing material (e.g., glass carbon fiber or other such type material) is introduced at the head of an extruder which is extruding the thermoplastic which is to be reinforced. The glass or roving material is in a chopped form and is introduced into the screw creating a hot molding compound consisting of the plastic and the reinforcement and it can either be quickly transferred to a press for compression molding or into what is typically called a shot pot where the material can be introduced into an injection type molding machine very common within the industry. Similar to direct compression and injection, in co-molding the fibers are introduced to the extruder but in this case are introduced to the thermoplastic material outside the screw typically in a mat or woven format where the two are consolidated typically into a sheet material for further processing.

Yet another method is traditional injection molding. In this process the reinforcing fibers are introduced to the pellet form of the thermoplastic and than introduced into a typical screw where the two comingle and than are injected into a mold to form the final part. One further example method is diaphragm forming. In this method, two sheets of silicon are used as a carrier to the reinforced thermoplastic. The material is positioned between two sheets of silicon, and placed between two hot platens to introduce heat to increase the temperature of the material above the forming temperature. The material is then moved to a forming station where it can be formed using positive air pressure. The silicone sheets may then be removed once the entire sandwich has cooled sufficiently. An additional prior method included vacuum bagging a thermoplastic piece to a one-sided tool and placed in an oven or autoclave to heat to the desired temperature for forming. Alternatively the tooling is heated to heat the material. Then tool would then be cooled and the molded part removed from the tool.

One disadvantage to the aforementioned methods of forming this type of material is that it can be time consuming to heat the material, move it into a molding station, form the material and then cool the material. This is in part due to the time required to needed to cool the material formation of each molding method. Another disadvantage is that the tooling requirements can be very expensive due to the need or ability of each mold to be heated and cooled in a direction from the exterior toward the part, which can thereby require aluminum or steel type molds which are very expensive to produce and difficult to maintain. For example, extensive fluid flow paths may be formed in the tooling. Another disadvantage to these types of methods of forming reinforced thermoplastic parts is the cycle time required to complete each piece in comparison to traditional thermoset materials. Thermoset materials use a chemical reaction to form the solid which can take a relatively short amount of time, but as discussed above, can be accompanied by the release of VOCs.

Thermoplastic materials are by-products of the petroleum industry and have a much lower cost of raw materials. However, historically the high cost of forming each piece of the thermoplastic material due to heating and cooling times of the molds and the associated cost of heating the molds renders thermoplastic pieces expensive in comparison to thermoset pieces. Therefore, in order to make thermoplastic products competitive, there must be a decrease in the cycle times and energy costs to reduce the overall cost of the end product. In addition thermoplastic material may be selected for the unique properties contained.

Much development has gone in to the molds that are used in the forming of thermoplastic materials. Examples of methods and apparatuses that may be used in the forming of thermoplastic materials are disclosed in U.S. Patent Ser. No. 61/261,193, which is incorporated herein in its entirety. For example, a heated bladder may be placed in contact with the thermoplastic material to force the thermoplastic material into contact with a mold. In another example, the mold itself may be heated to raise the temperature of the thermoplastic material above its forming temperature. A vacuum may also be used to pull the thermoplastic material into contact with the mold during the shaping process.

Thermoplastic materials may be provided in shaped forms that are produced from a single sheet of thermoplastic material. For added strength and/or thickness, multiple sheets of thermoplastic material may be layered and thermoformed together. By applying heat to the thermoplastic material, the sheets melt together and combine to form a single formed unit with increased thickness and/or strength as compared to a single sheet of material. In another embodiment, cores may be placed between layers of thermoplastic material to provide additional strength and stiffness to the thermoplastic material. The use of typical cores, such as foams and honeycombs, to form composite materials can limit the processes and resulting shapes. For instance, most all composite sandwiches are flat or only curved in one dimension. This is because the combination of materials can be very difficult to lay up and form into complex shapes.

SUMMARY

Thermoplastic composite components and their methods and apparatus for forming are provided herein. The methods and apparatus can advantageously result in reduced energy requirements and reduced cycle times, thereby resulting in more economical components.

In one aspect, instead of heating the mold itself in order to transfer heat to the thermoplastic material, a heated medium other than the mold itself is used to transfer heat. This allows for the use of molds that do not have internal fluid chambers provided to facilitate the heating of the mold, thereby reducing the cost of producing such molds. However, the heated medium disclosed may also be used in combination with a heated mold. The heated medium may be disposed between the mold and the material, such as in the case of a closed mold, or may be disposed on an opposite side of the material from the mold, as in the case of an open mold. The heated medium may be a heated fluid, such as a liquid, and more particularly oil, that is much more readily brought to temperature as compared to the mold tooling itself. Oil is preferred as a heat transfer fluid because it undergoes little to no expansion when heated, although other fluids can also be acceptable. In one aspect, the heated fluid may be contained at least partially in a flexible membrane, thereby allowing the fluid to be in contact with the material both prior to and during forming of the material to the mold.

The thermoplastic materials may advantageously be reinforced thermoplastic materials. The thermoplastic material may be provided as fiber-reinforced polymer sheets. The shaped parts are manufactured using any reinforced thermoplastic currently available which may or may not include a reinforcing member such as glass, carbon or other such reinforcing fibers and material intended to add strength to the thermoplastic. These products advantageously can provide for more durable panels and/or lighter weight panels, particularly when compared to traditional fiberglass or other thermoset techniques. Furthermore, the use of polymer sheets, as opposed to thermosets, results in thermoformable panels that can also be welded or otherwise joined at least in part by heating the polymers. The methods described herein can also form said reinforced thermoplastic (RTP) in a manner and using apparatus which decreases the cost of tooling. In addition the methods and apparatus described herein can advantageously increase cycle times of molding said RTP. The term RTP as used herein should be understood to encompass the use of non-reinforced thermoplastic material as well as reinforced thermoplastic material.

In another aspect, a method is provided wherein the formation of a molded piece is achieved. The method is initialized by the selection of RTP to achieve the desired structural characteristics desired in the final part. Further, a mold tool is selected having the in-mold form of the desired finished product. Preferably, the mold tool has a mold flange that surrounds the shaping portion of the mold tool. The RTP is pre-positioned into the mold such that the RTP overlays the shaping portion and the mold flange. In one aspect of the method, a vacuum can draw on the mold facing side of the RTP to remove air between the RTP and the mold tool. Before the vacuum is applied, a bag or bladder is placed on the face RTP opposing the mold. Once the bladder has been placed on the RTP and the vacuum has been drawn, the bladder is filled with a heat transfer fluid, preferably having low thermal expansion properties, to heat the RTP to a temperature in excess of the RTP forming temperature to permit the RTP to conform to the mold. The bladder may be provided with both an inlet and an outlet such that the bladder may be filled through the inlet and emptied through the outlet. Alternatively, the inlet and outlet may be used to continuously circulate the heat transfer fluid through the bladder. The method can include removing the heated heat transfer fluid from the bladder or circulating or filling with a cooler fluid and allowing the shaped RTP to cool to below the forming temperature. Once the temperature of shaped RTP is below the forming temperature, the bladder and the shaped RTP piece may be removed from the mold. The method may further include filling the bladder with a cooling fluid. This may facilitate a more rapid cooling of the temperature of shaped RTP piece below the forming temperature.

The method can be used to form shaped parts in an open or closed mold situation based on the desired finish part. For example, an open mold may be used to make a shaped part such as a car panel or other panel wherein only one surface is required to have a cosmetic surface. Further, a closed mold application may be utilized for forming a hollow or otherwise closed part. Additionally, two or more molded pieces may be joined together to provide the desired structure. A hollow or otherwise closed part may be filled with a material to provide additional structural strength, resilience, floatation or other properties. The method may include the incorporation of additional structural pieces to shape or strengthen the finished shaped RTP piece and may be incorporated in a variety of ways. For example, a structural material may be sandwiched between layers of RTP. In another embodiment, a structural reinforcing member may be positioned in the formation of a hollow shaped RTP piece. In a further embodiment, a mold insert may be positioned prior to positioning the RTP material on the mold tool to provide further shaping of the RTP during its shaping on the mold. The mold insert may then be removed from the shaped RTP piece after the shaped RTP piece is removed from the mold tool.

It is not uncommon for thermoplastic heating, forming, and cooling process times to be at least hour, and can be over an hour. This can make the cost of the formed thermoplastic composite materials much higher than traditional thermoset composite process times. The use of a heat transfer fluid alone or in combination with a cooling fluid can advantageously provide a significant decrease in the amount of time required to provide a thermal formed plastic piece, thereby reducing the cycle time for manufacture of such pieces. Since the material can be more expensive than traditional materials, long process times can make the overall cost unattractive, even though there are certain physical property advantages.

There are numerous types of structures that can be formed using this apparatus and the methods disclosed herein. Such structures may include, but are not limited to paddle boards, surfboards, aircraft wings, windmill blades or any other closed or three dimensional parts that require the entire outer surface to be somewhat cosmetic in its characteristics. Some structures may require the formation of a plurality of segments of the structure, that are then joined together to provide the finished structure.

BRIEF DESCRIPTION OF THE DRAWINGS

FIGS. 2a-2h are representative side cut-away views of the disclosed apparatus and steps that may be involved in one embodiment of an open mold process;

FIGS. 3a-3h are representative side cut-away views of the disclosed apparatus and that may be involved in another embodiment of an open mold process;

FIGS. 5a-5c are representative side cut-away views of the disclosed apparatus and an embodiment incorporating a reinforcement material;

FIGS. 6a-6d are representative side cut-away views of the disclosed apparatus and an embodiment including a filled hollow molded part;

FIGS. 7a-7d are representative side cut-away views of the disclosed apparatus and an embodiment including forming a hollow molded part having multiple chambers;

FIGS. 8a-8d are representative side cut-away views of the disclosed apparatus and an embodiment including forming a hollow molded part incorporating a reinforcement member;

FIGS. 9a-9d are representative side cut-away views of the disclosed apparatus and an embodiment incorporating the use of a mold insert in the formation of a molded part;

FIG. 11 is a cross-sectional view of a filled thermoplastic composite component having an outer thermoplastic layer, an inner layer of a porous material and filled with foam; and FIG. 12 is a detailed view of a portion of the filled thermoplastic composite component showing mechanical bonds between the thermoplastic, porous material and foam.

DETAILED DESCRIPTION OF THE DRAWINGS

Each of the FIGS. 1-9, for simplicity of disclosure, depicts a substantially concave mold cavity in the molding surface of the molding tool as an exemplary structure. It will be understood that the molding surface may be a convex structure projecting from the molding surface of the mold tool without deviating from the disclosure. Either an open or a closed mold can be suitable, depending upon the desired component to be produced. Similarly, the molding surface may have a complex shape incorporating complex structures to provide the desired molded part.

The methods and apparatus can be used for shaping components from reinforced thermoplastic (RTP) to provide molded pieces. Thermoplastic materials contemplated in this disclosure include thermoplastic material that are reinforced or that are provided without reinforcement. The thermoplastic materials may be reinforced thermoplastic materials and further may be provided as fiber-reinforced polymer sheets. The molded pieces may be manufactured using any RTP material currently available which may or may not include a reinforcing member such as glass, carbon or other such reinforcing material intended to add strength to the thermoplastic. These sheets advantageously provide for more durable and/or lighter weight panels, particularly when compared to traditional fiberglass or other thermoset techniques. Furthermore, the use of polymer material in sheet or other forms (such as a woven cloth), as opposed to thermosets, results in thermoformable panels that can also be welded or otherwise joined at least in part by heating the polymers. This method further being described as a method of forming said RTP in a manner which decreases the cost of tooling. The term RTP as used herein should be understood to encompass the use of non-reinforced thermoplastic material as well as reinforced thermoplastic material, depending upon the desired application or use of the component.

Figure 1A:
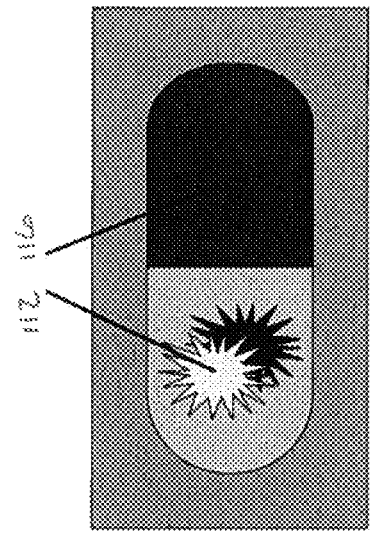
FIGS. 1a-1b are bottom mold top views with the molds in an open position.
Figure 1B:
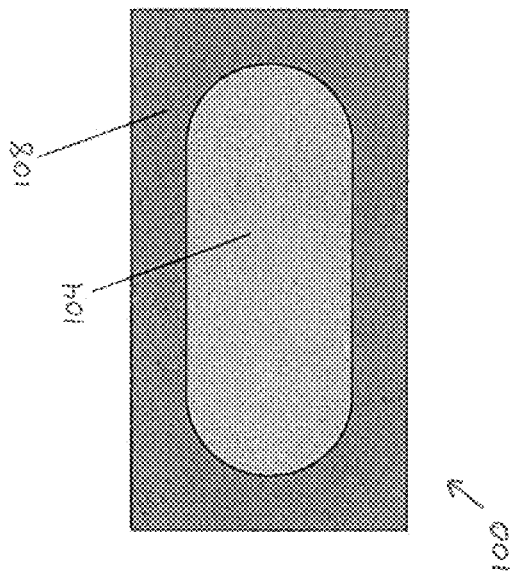

Turning first to FIGS. 1a-1b, a top view of a mold 100 is provided. The mold 100 has a shaping surface 104 surrounded by a mold flange 108. Preferably, the mold flange 108 surrounds the entire shaping surface 104 as the flange 108 aids in maintaining a vacuum seal during the shaping process. However, other means, as known in the art, may be provided to aid in the formation of a seal at locations around the shaping surface 104 where the flange does not completely surround the shaping surface due to limitations stemming from the desired shape of final molded product. The shaping surface 104 may be convex, concave, or may have a complex shape depending on the shape of the desired final product. Prior to placing the RTP material on the mold 100, graphics 112 and/or an in-mold coating 116 may be provided on the shaping surface 104. During the shaping process the graphics 112 and/or in-mold coating 116 are transferred to the RTP material to provide graphics or a coating on the molded part.

An apparatus for shaping RTP material is provided as, for example, in FIGS. 2a-2h and would be characterized as an open mold. The apparatus includes at least a mold 200 and a bladder 250 which are described in more detail below. The mold 200 is provided with a shaping surface 204 and a mold flange 208 substantially surrounding the shaping surface 204. At least one vacuum passage 220 is provided though the mold 200 to the shaping surface 204. The vacuum passage 220 is functionally connected to a vacuum pump (not shown) effective to apply a vacuum at the surface of the shaping surface 204. The mold 200 may be formed from any material desired as long as it is able to withstand heat in excess of the heat of deformation of the RTP material during the forming process. For example, the mold 200 may be formed of materials including, but not limited to, composite, aluminum, and steel. As the heat transfer process of this disclosure no longer requires the heat to be provided through the mold 200 as in many of the previously described molding methods, the number of materials the mold 200 may be formed from is increased.

The bladder 250 may be formed from a variety of materials having flexible and heat resistant characteristics. For example, the bladder 250 may be formed from silicone, traditional vacuum bagging material, or any other flexible, non-porous material that also exhibits heat resistance. The flexibility of the bladder 250 enables it to conform to the desired shape of the mold 200. The bladder 250 is provided with at least one port 254 that is in fluid communication with both the interior 256 and exterior 258 of the bladder 250. The at least one port 254 may be functionally connected to a source of heat transfer fluid (not shown). The at least one port 254 may also be functionally connected to a source of cooling fluid (not shown). Additionally, a secondary fixture 375, may be incorporated to contact the bladder 250 and aid in the forming process.

A first embodiment of the method for forming a molded piece in an open mold is disclosed, as illustrated in FIGS. 2a-2h. As shown in FIG. 2a, a mold 200 is selected to provide the desired shape of the molded piece 290. As disclosed above, the mold 200 is provided with a shaping surface 204 substantially surrounded by a mold flange 208. The mold may have a graphic 112 or an in-mold coating 116 deposited on the shaping surface 204 of the mold 200. Once the desired mold 200 has been selected, a piece of RTP 260 is placed on the mold 200 (see FIG. 2b). The RTP piece 260 has a mold facing surface 262, an opposing surface 264 facing away from the mold, and should be of a size and shape such that there is sufficient RTP material to deform onto the shaping surface 204 while concurrently overlaying the mold flange 208. The RTP piece 260 may be placed by hand layup, robotic layup or any other method sufficient for positioning the material in the desired thicknesses and location as to determine the structural integrity of the final part. The opposing surface 264 of the RTP piece 260 may then be covered by the bladder 250 (see FIG. 2c). The bladder 250 may be provided in such a manner so as to directly correspond to the particular shape of the mold 200 or the shaping surface. A vacuum may be applied through the at least one vacuum passage 220 to the area between the shaping surface 204 and the mold facing surface 262 of the RTP piece 260 (see FIG. 2d). The vacuum should be of a force sufficient to draw the RTP piece 260 in direct conforming contact with the shaping surface 204 of the mold 200. Alternatively, the vacuum may be applied prior to the bladder 250 being positioned on the opposing face 264. Alternatively, the bladder may be provided between the mold and the RTP piece.

Once the vacuum has been applied and the bladder 250 is in place, heat transfer fluid 270 is transferred into the bladder 250 through the at least one port 254 (see FIG. 2e). The heat transfer fluid 270 is of a temperature greater than the deforming temperature of the selected RTP piece 260. For example, the temperature of the heat transfer fluid 270 is preferably greater than about 250° F., more preferably greater than about 350° F., and even more preferably in the range of about 380° F. to about 450° F. The heat transfer fluid 270 may be heated oil, a heated aqueous solution, steam, or any other fluid capable or being transferred into the bladder through the at least one inlet 254. The heat transfer fluid 270 should remain in the bladder 250 for an amount of time sufficient to raise the temperature of the RTP piece 260 to a temperature greater than the forming temperature of the RTP piece 260. In addition, the mold 200 may be heated to aid in the thermal forming of the RTP pieces as well. Such an arrangement would allow the RTP piece to be heated on both planar surfaces. The heat transfer fluid 270 may then be removed from the bladder 250 and the RTP piece 260 is allowed to cool to a temperature below the forming temperature (see FIG. 2g). Alternatively, a cooling fluid 280 may be transferred into the bladder 250 through the at least one port 254 after the heat transfer fluid 270 has been removed to aid in the cooling of the RTP piece 260 to a temperature below the forming temperature (see FIG. 2f). The cooling fluid may be a cool oil, cool aqueous solution, or any other fluid capable of being transferred into and out of the bladder 250 through the at least one inlet 254. After the RTP piece 260 has cooled below the forming temperature, the vacuum being applied through the at least one vacuum passage 220 may be released (see FIG. 2g). At a time before, during, or after the vacuum is released but after the heat transfer fluid 270 or the cooling fluid 280 has been removed from the bladder 250, the bladder 250, may be removed from the opposing surface 264 (see FIG. 2h). Once, the bladder 250 has been removed and the vacuum has been released, the molded piece 290 may be removed from the mold 200 and process may be repeated with a next RTP piece 260.

A second embodiment of the method for forming a molded piece in an open mold is disclosed, as illustrated in FIGS. 3a-3h. In this embodiment, a secondary fixture 375 may be utilized. Similar to the previous embodiment, a mold 300 is selected to provide the desired shape of the molded piece 390 and a RTP piece 360 is positioned to overlay the shaping surface 304 and the mold flange 308 (see FIG. 3a). The bladder 350 may then be positioned on the opposing face 364 of the RTP piece 360 (see FIG. 3b) and then a secondary fixture 375 may be positioned on the bladder 350 so as to compress the bladder 350 in a direction toward the mold 300 (see FIG. 3c). A vacuum may be applied through the at least one vacuum passage 320 to the area between the shaping surface 304 and the mold facing surface 362 of the RTP piece 360 (see FIG. 3d). The vacuum should be of a force sufficient to draw the RTP piece 360 in direct conforming contact with the shaping surface 304 of the mold 300. Alternatively, the vacuum may be applied prior to the bladder 350 being positioned on the opposing face 364 and the secondary fixture 375 being positioned on the bladder 350. The secondary fixture 375 works in conjunction with the vacuum to force the RTP piece 360 in conformal contact with the shaping surface 304.

Once the vacuum has been applied and the bladder 350 and secondary fixture 375 are in place, heat transfer fluid 370 is transferred into the bladder 350 through at least one port 354 (see FIG. 3e). The port may be accessed through an opening 378 in the secondary fixture 375. Alternatively, at least one port 354 may be accessed through a gap between the secondary fixture 375 and the mold 300 (not shown). After the heat transfer fluid 370 has been in the bladder 350 for a time sufficient to raise the temperature of the RTP piece above the formation temperature, the heat transfer fluid 370 may then be removed from the bladder 350 and the RTP piece 360 is allowed to cool to a temperature below the forming temperature (see FIG. 3g). Alternatively, a cooling fluid 380 may be transferred into the bladder 350 through the at least one port 354 after the heat transfer fluid 370 has been removed to aid in the cooling of the RTP piece 360 to a temperature below the forming temperature (see FIG. 3f). After the RTP piece 360 has cooled below the forming temperature, the vacuum being applied through the at least one vacuum passage 320 may be released (see FIG. 3g). At a time before, during, or after the vacuum is released, but after the heat transfer fluid 370 or the cooling fluid 380 has been removed from the bladder 350, the secondary fixture 375 may be removed from the bladder 350 and the bladder 350 may be removed from the opposing surface 364 (see FIG. 3h). Once, the bladder 350 has been removed and the vacuum has been released, the molded piece 390 may be removed from the mold 300 and process may be repeated with a next RTP piece 360.

Another embodiment of the apparatus for shaping RTP material is provided as, for example, in FIGS. 4a-4h and would be characterized as a closed mold. The apparatus includes at least a mold 400 and a bladder 450 which are described in more detail below. The mold 400 is provided with a lower mold 403 having a lower shaping surface 404 and a lower mold flange 405 substantially surrounding the lower shaping surface 404, and an upper mold 406 having an upper shaping surface 407 and an upper mold flange 408 substantially surrounding the upper shaping surface 407. At least one lower vacuum passage 420 is provided though the lower mold 403 to the lower shaping surface 404. At least one upper vacuum passage 422 is provided though the upper mold 406 to the upper shaping surface 407. The vacuum passages 420 and 422 are functionally connected to at least one vacuum pump (not shown) effective to apply a vacuum at the surface of the upper and lower shaping surfaces 404 and 407. The lower mold 403 and the upper mold 406 are shaped such that when the lower mold 403 is brought toward the upper mold 406, the lower flange 405 and the upper flange 408 are directly opposed to each other. In the closed position, for example, only the edges of RTP pieces 460, 465 in the mold would separate the opposing flanges 405, 408. The closed mold may be used for example to form hollow molded pieces 490.

Similar to the open mold embodiments, a bladder 450 is provided. The bladder 450 is provided with at least one port 454 that is in fluid communication with both the interior 256 and exterior 258 of the bladder 450. The at least one port 454 may be functionally connected to a source of heat transfer fluid (not shown). The at least one port 454 may also be functionally connected to a source of cooling fluid (not shown). The bladder should be of a size sufficient that once it is filled with heating or cooling fluid, the edge of the bladder expands to all interior surfaces of the mold.

Figure 4D:
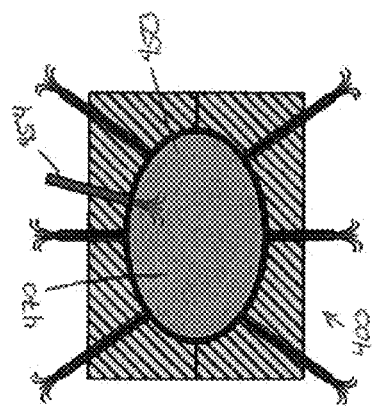
FIGS. 4a-4h are representative side cut-away views of the disclosed apparatus and steps that may be involved in one embodiment of a closed mold process.
Figure 4C:
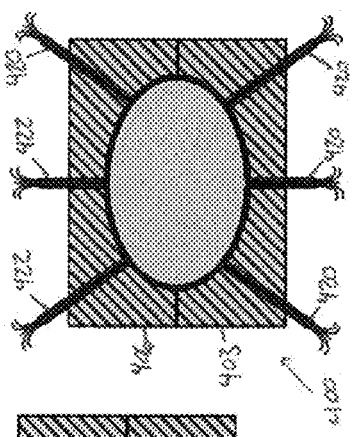
Figure 4B:
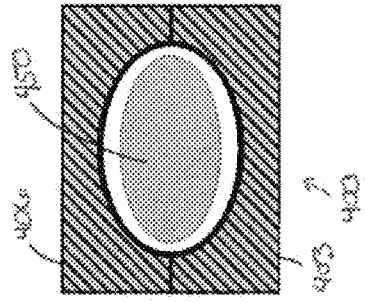
Figure 4A:
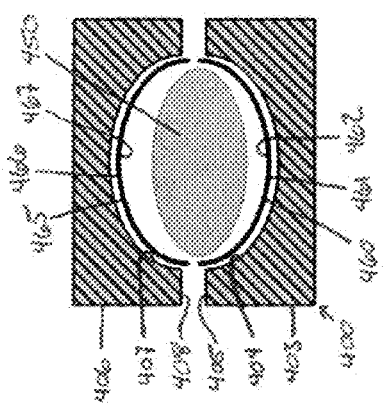
Figure 4H:
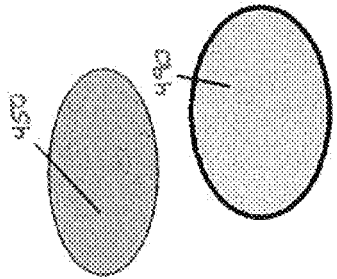
Figure 4G:
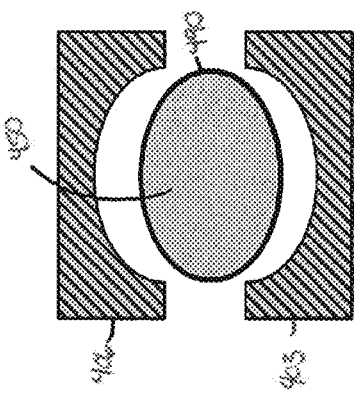
Figure 4F:
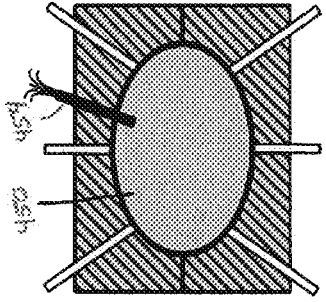
Figure 4E:
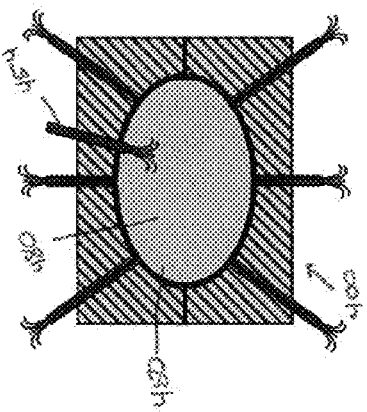

A first embodiment of the method for forming a hollow molded piece 490 in an closed mold 400 is disclosed, as illustrated in FIGS. 4a-4h. As shown in FIG. 4a, a mold 400 is selected to provide the desired shape of the molded piece 490. As disclosed above, the mold 400 is provided with a lower mold 403 having a lower shaping surface 404 substantially surrounded by a lower mold flange 405, and an upper mold 406 having an upper shaping surface 407 substantially surrounded by an upper mold flange 408. The upper and/or lower mold may have a graphic 112 or an in-mold coating 116 deposited on the shaping surface 404, 407 of the mold 400. Once the desired mold 400 has been selected, a lower RTP piece 460 is placed on the lower mold 403. The lower RTP piece 460 has a lower mold facing surface 461, a opposing surface 462 facing away from the lower mold, and should be of a size and shape such that there is sufficient RTP material to deform onto the shaping surface 404. Similarly, an upper RTP piece 465 is placed on the upper mold 406. The upper RTP piece 465 has a upper mold facing surface 466, a opposing surface 466 facing away from the upper mold, and should be of a size and shape such that there is sufficient RTP material to deform onto the shaping surface. The RTP pieces 460, 465 may be placed by hand layup, robotic layup or any other method sufficient for positioning the material in the desired thicknesses and location as to determine the structural integrity of the final part.

A bladder 450 is placed such that it is sandwiched between the upper and lower RTP pieces 460, 465 and facing the opposing surfaces 462, 467 (see 4a). The bladder 450 may be positioned on the lower RTP piece 460 before or after the upper RTP piece 465 is positioned. In an arrangement where the upper RTP piece 465 has not yet been positioned, the upper RTP piece 465 may be previously adhered or otherwise fixed to the bladder 450, such that the positioning of the bladder 450 and the upper RTP piece 465 occurs concurrently. The lower mold 403 and the upper mold 406 are brought toward one another such that the lower flange 405 and the upper flange 408 are brought into contact. Alternatively, a bladder may be provided between the lower mold 403 and the lower RTP piece 460 and/or a bladder may be provided between the upper mold 406 and the upper RTP piece 465. Such an arrangement may be provided instead of, or in combination with, a bladder positioned between the lower and upper RTP pieces 460, 465 as described above.

After the mold has been closed, a vacuum is applied through at least one vacuum passage 420 in the lower mold 403 to the area between the lower shaping surface 404 and the lower mold facing surface 462 of the lower RTP piece 460. Similarly, a vacuum is applied through at least one vacuum passage 422 in the upper mold 406 to the area between the upper shaping surface 407 and the mold facing surface 467 of the RTP piece 465 (see FIG. 4c). The vacuum should be of a force sufficient to draw the RTP pieces 460, 465 in direct conforming contact with the shaping surfaces 404, 407 of the mold 400.

Once the vacuum has been applied heat transfer fluid 470 is introduced into the bladder 450 through the at least one port 454 (see FIG. 4d). The at least one port 454 may be accessed through an opening provided in either or both of the upper and lower molds 403, 406. The heat transfer fluid 470 is of a temperature greater than the deforming temperature of the selected RTP pieces 460, 465. For example, the temperature of the heat transfer fluid 470 is preferably greater than about 250° F., more preferably greater than about 350° F., and even more preferably in the range of about 350° F. to about 420° F.

The heat transfer fluid 470 may be heated oil, a heated aqueous solution, steam, or any other fluid capable or being transferred into the bladder through the at least one inlet 454. The heat transfer fluid 470 should remain in the bladder 450 for an amount of time sufficient to raise the temperature of the RTP pieces 460, 465 to a temperature greater than the forming temperature of the RTP pieces 460, 465. Additionally, the heat from the heat transfer fluid 470 causes the lower and upper RTP pieces 460, 465 to weld or otherwise melt together. Furthermore, the mold 400 may be heated to aid in the thermal forming of the RTP pieces as well. Such an arrangement would allow the RTP pieces to be heated on the upper, lower, and inner surfaces. The heat transfer fluid 470 may then be removed from the bladder 450, through the at lest one port 454 and the RTP pieces 460, 465 are allowed to cool to a temperature below the forming temperature (see FIG. 4*f*). Alternatively, a cooling fluid 480 may be transferred into the bladder 450 through the at least one port 454 after the heat transfer fluid 470 has been removed to aid in the cooling of the RTP pieces 460, 465 to a temperature below the forming temperature (see FIG. 4*e*). The cooling fluid may be a cool oil, cool aqueous solution, or any other fluid capable of being transferred into and out of the bladder 450 through the at least one inlet 454. After the RTP pieces 460, 465 have cooled below the forming temperature, the vacuums being applied through the at least one vacuum passages 420 and 422 may be released (see FIG. 4*f*). The upper and lower molds 403, 406 may then be separated and the hollow molded piece 490 may be removed from the mold 400 (see FIG. 4*g*).

The bladder 450 may remain within the hollow molded piece 490 (see FIG. 6*a*). Alternatively, the bladder may be removed from the hollow molded piece 490 through an opening 495 in the surface of the hollow molded piece 490 (see FIG. 6*b*). For example, the opening 495, may be at the location the at least one port 454 of the bladder 450 passed through one of the RTP pieces 460, 465, during production. Depending on the desired characteristics of the final hollow molded piece 490 it may be left hollow or it may be filled with an additional material. The hollow molded piece, either while still in the mold 400 or after the hollow molded piece 490 has been removed from the mold. The hollow molded piece 490 may be filled with a fluid or other substance 496 to provide the desired characteristics. The substance 496 may be selected to provide strength, buoyancy, other desired properties. For example, the substance may be, but is not limited to urethane, expanded polystyrene, or any other filling material. In such a manner the urethane would then expand filling the hollow molded piece 490 with a desired amount of foam to give it superior strength qualities. In additional, the filled piece 499 would have superior durability. Preferably, though not necessarily, the substance 496 can bond to the polymer of the sheets to form a unitary member. In addition the hollow molded piece 490 may be filled with substance 496 that is a nonexpanding fluid or solid to create and entirely different flex and strength curve attributes. The substance 496 may be introduced into the hollow molded piece 490 through the opening 495 in the surface of the hollow molded piece 490 (see 4*c*) to provide the filled molded piece 499. Alternatively, the bag may be left in the molded piece and the substance 496 may be introduced into the bag to provide the filled molded piece.

An embodiment that may be used with either the open or closed mold processes is provided where a reinforcement piece 530 is incorporated into the final molded piece 590 as shown in FIGS. 5*a-c*. After a mold 500 has been selected, a first RTP piece 560 is positioned on the mold 500 as described above. At least one reinforcement piece 530 is then positioned on the side of the RTP piece 562 facing away from the shaping surface 504 of the mold 500. The reinforcement piece 530 may be of any size and shape desired to provide the desired final molded piece 590. Further, the reinforcement piece 530 may be made of any material, including plastics, metals, woods, etc., sufficient to provide a reinforcing attribute to the final molded piece 590. A second RTP piece 465 is then positioned to overlay the first RTP piece 560 and the reinforcement piece 530 such that the reinforcement piece 530 is sandwiched between the first and second RTP pieces 460, 465. This arrangement of materials is then covered by a bladder 550 (see FIG. 5*b*), and production of the final molded piece 590 incorporating the reinforcement piece 530 (see FIG. 5*c*) is carried out in line with one of the processes as described above. For example, it is envisioned that both halves of a closed mold could incorporate reinforcement pieces 530.

Additional embodiments are provided wherein multiple chambers may be provided. For example, in FIGS. 7*a-d*, a closed mold is utilized and the process is carried out as described above. In one embodiment additional RTP pieces 768 and 769 are arranged between two bladders 750 and 751 to span the distance between the lower RTP piece 760 and the upper RTP piece 765 (see FIGS. 7*a* and 7*b*). It is to be understood the fewer or greater number of reinforcing RTP pieces and chambers may be provided. Once the bladders 750, 751 have been filled with heat transfer fluid 770, as described above, the heat causes the lower and upper RTP pieces 760, 765 to weld together. Similarly, the additional RTP pieces 768, 769 weld to each other and to the lower and upper pieces 760, 765. Once the structure 790 has cooled, the bladders 750, 751 may be removed, or left in the structure 790 having multiple chambers 791, 792. One or more of the chambers 790, 791 of the structure 790 may also be filled as described above to provide additional properties if desired.

Alternatively, or in combination, additional structural members may be incorporated in either of the open or closed mold processes. As shown in FIGS. 8*a-d*, a dissimilar reinforcement piece 885 may be incorporated to provide a reinforced molded piece 890. For example the reinforcement piece 885 may be incorporated as described above to span the distance between the lower and upper RTP pieces 860, 865. The reinforcement member 885 may be any material sufficient to provide the desired property, for example, plastics, composites, metal, woods, etc. The reinforcement member 885 is placed between the lower and upper RTP pieces 860, 865 while the mold is in an open position (see FIG. 8*a*). As depicted in FIGS. 8*a-d*, the reinforcement member 885 is an I-shaped member. It is to be understood that the reinforcement member may be provided in any other conceivable shape that would fit within the interior of the mold 800. For example, a cork or other porous material liner could be provided that lines the interior of the lower and upper RTP pieces 860, 865. In such an arrangement, the cork liner may partially insulate the RTP pieces 860, 865 from the heat provided by the heat transfer fluid 870. In such an arrangement, it may be necessary to increase the amount of time the heat transfer fluid is resident within the bladder to thermal form the RTP pieces 860, 865. Alternatively, heat may also be provided through the mold. Once the mold 800 is closed the reinforcing member 885 is in contact with both the upper and lower RTP pieces 860, 865 (see FIG. 8*b*). One or more bladders are then filled with heat transfer fluid 870 (see FIG. 8*c*) and the process is carried out as described above. Ultimately, the molded reinforced piece 890 is removed from the mold 800. As described above, the molded piece 890 may be filled or hollow and the one or more bladders 850, 851 may be removed or may remain in the molded piece 890.

An additional embodiment envisions the use of one or more mold inserts 925 may be used in open or closed mold processes. The insert may be of any size or shape as required to provide the shape of the final molded piece 990. The insert may be made of any material that has sufficient heat resistance including composites, plastics, metals, woods, etc. Prior to placing the RTP piece 960 in contact with the mold 900, a mold insert 925 may be placed on the shaping surface 904. The shaping surface 904 and the mold insert are then overlaid by an RTP piece 960 (see FIG. 9a). The process is carried out as described above, including overlaying the RTP piece with a bladder 950 (see 9b). After the process has been completed, the bladder 950 is removed and the molded piece 990 is removed from the mold 900. The mold insert 925, may then be removed from the molded piece 990.

It will be appreciated that the cycle time of a molded RTP piece will greatly be reduced, due to the ability of the fluid to transfer energy directly to the RTP compared to traditional methods which require external heat followed by a forming station or the complete heating and cooling of the mold requiring expensive tooling and very slow cycle times. The resulting parts can be lighter and stronger than those made using traditional thermoset techniques, as well as moldable as they are not formed using a thermoset material. An additional advantage of such RTP materials would be the orientation of the particular reinforcing glass or other structure may be oriented to give different flex properties allowing the manufacture to specifically design in the desired flex pattern. In addition waste trim and otherwise excess material can be more readily recycled, unlike traditional material.

In an additional embodiment, the RTP piece is placed in contact with the shaping surface of a mold and then placed under a vacuum bag and vacuumed to the tool. The vacuum bag may then be overlaid by the bladder. Alternatively, the design of the vacuum bag may be that it has a secondary layer that creates a bladder on the backside (side of the bag away from the RTP piece) of the initial layer that is vacuumed to the mold and RTP piece. The vacuum line comes through this layer to pull vacuum. At least one port is provided in the bladder and attached to the heat transfer fluid source. This allows the oil to directly heat the material as described above. Once RTP piece has been shaped, the piece is allowed to cool as described above. Once the piece has cooled, the vacuum may be released and the molded piece may be removed from the mold. The vacuum bag may be formed from film with a maximum temperature of 450 degrees Fahrenheit, such as available from Airtech International, Inc., Huntington Beach, Calif.

The reinforced thermoplastic materials and methods of forming the reinforced thermoplastic materials described herein can incorporate a porous material, such as a cork-based product, in conjunction with thermoplastic composite materials. When incorporated into a thermoplastic composite product, cork may provide, for example, enhanced strength, flexibility, and durability, while reducing costs and providing for more elaborate three dimensional shapes to be formed as compared to traditional core materials.

Cork is available in many forms and all forms of cork may be suitable. Cork has long been used commercially as an insulation material and in the past was widely used in the refrigeration industry. Cork is produced from the bark layer of cork trees, and more specifically from the Cork Oak tree. Cork has traditionally been used in the forming of cork stoppers for wine bottles and for cork based bulletin boards. The development of artificial cork and plastic stoppers for wine bottles has resulted in more cork being available at a lower cost.

Cork may be provided in sheets of cork that are in their natural form following harvesting of the sheets of the cork producing trees. Cork is also available in sheets and various other forms where the cork has been ground into granular particles and then bound together in a sheet or other form using a binder or resin. Corks that have been ground into a granular form and subsequently bound together may be known a "technical cork." All forms of cork, whether in natural form or technical cork, are contemplated for use in the present disclosure. Ideally, technical corks for use in the present methods will have binders that are not heat sensitive and where the cork granules will not fall apart upon the application of heat. However, these technical corks are not precluded from use and may also be used. For example, cork may be obtained from Amorim Cork Composites, Portugal. One composited cork product is called CoreCork. They differentiate their product by using high quality resin to bond the cork granules together. Lower cost cork sheets may have contaminants in the resin used. When the less expensive cork was quenched, it absorbed much more water and caused the cork core to start to fall apart. The more expensive cork did not absorb water and did not show any problems holding together. However, depending on the application and whether moisture may be present, considerations may be made as to the cost and quality of cork used. Additionally, the thermoplastic material, once mechanically bonded to the cork, will have to maintain the structure of the cork material. Further, the binder or resin used may have a melting temperature that needs to be considered. For example, if the temperature for forming exceeds that of the binder, the cork may fall apart above a certain temperature.

Cork of any suitable thickness may be used. For example sheets of cork ranging in size from 1/32 " to 1' are widely available, however, the cork used as described in this disclosure may be thicker or thinner depending on the properties desired in the final product. Depending on the application, the properties of the particular cork used should be considered in forming the end product. Thermoplastic may be bound to any of the cork sources.

Cork has many properties that make it advantageous for use with thermoplastic materials. For example, cork has a very high insulation value. The high insulation value can be utilized to provide thermoplastic walls or other structures where insulation is needed to prevent heat entry or loss. For example, the thermoplastic materials can be used in walls of refrigerated trailers in the shipping industry. Representative thermal conductivity and insulation values of cork are included in the Table 1.

TABLE 1

Thermal conductivity and density values at 20-25° C. of cork insulation

| Type | Density (kg/m$^3$) | Thermal conductivity (W m$^{-1}$ ° C.$^{-1}$)/ (kcal h$^{-1}$ m$^{-1}$ ° C.$^{-1}$) |
|---|---|---|
| Granulated loose, dry | 115 | 0.052/0.0447 |
| Granulated | 86 | 0.048/0.041 |
| Expanded cork slab | 130 | 0.04/0.344 |
| Expanded cork board | 150 | 0.043/0.037 |
| Expanded bonded with resins/bitumen | 100-150 | 0.043/0.037 |
| Expanded bonded with resins/bitumen | 150-250 | 0.048/0.041 |

Cork is also very hard to ignite and/or burn, meaning that cork may be exposed to increased temperatures. This advantageous property can be utilized during the application of heat in the forming and shaping of the thermoplastic materials and meaning the cork can handle the temperatures needed to melt and form the thermoplastic composites. This is typically only found in very high temperature (expensive) foams and a handful of other materials. The cork is also flexible in all directions (like some foam materials, but much more flexible than honeycomb and unidirectional balsa or other wood cores). Cork is also very elastic and resistive to compression.

Cork is also porous. This porosity may be utilized when the composite sandwich has to be vacuumed to the tool. When pulling vacuum from the tool side for hollow parts, it is possible to be able to pull the vacuum through the sandwich to pull the bag tight. Many types of foam and other materials are not porous and will not allow the vacuum to pass through. The porosity of the cork also allows the thermoplastic material, when heated, to melt into the cork and form a mechanical bond. Foam can also expand into the cork due to the porous nature thereof to form a mechanical bond. Once the thermoplastic material cools to below the forming temperature, a mechanical bond is formed between the facing surface of the thermoplastic material and the cork material it is in contact with. From a strength standpoint the more dense the cork is the greater the strength. Also from a weight standpoint, more weight will result in a greater strength. For vacuum, enough porosity to pull some vacuum through the part is sufficient.

An additional property of cork is that it has a rebound property similar to that of thermoplastics. When a thermoplastic material is subjected to an impact the thermoplastic will flex. If the core material does not rebound from this impact along with the thermoplastic skin, it may separate and cause delamination. Since cork has a rebound property similar to the thermoplastic material, when subjected to an impact, it will rebound similar to the thermoplastic material and maintain its mechanical bond and avoiding delamination. Cork typically has an average mechanical resistance of 2.2 $kg/m^2$.

Thermoplastic materials contemplated for use in the present disclosure include single sheets of thermoplastic material, multiple sheets of thermoplastic material placed adjacent to and in a facing relationship with other thermoplastic material. Generally, polypropylene is not considered a structural plastic and is more flexible. It will give more under impact and flex more under force. A PET plastic is a structural plastic that is stiffer and will give less.

Thermoplastic composites used include TWINTEX (by Owens Corning, a co-mingled fiber containing polypropylene and fiberglass) and POLYSTRAND (same as company name, sheets of Polypropylene or PET plastic formed over a variety of fibers such as fiberglass and carbon fiber). These cloths or sheets (referred to herein as sheets) can include many different types of plastics and fibers so long as the finished product can be formed into a solid sheet in the desired shape. These sheets come in different thicknesses, usually referred to as weight per square yard (22 oz, 30 oz, 44 oz). Sheets can then be stacked on top of each other and fibers oriented in certain directions to create the desired strength and stiffness.

Single or multiple thermoplastic sheets that have been reinforced and/or comingled with reinforcing fibers, fabrics, and/ or sheets are also considered. For example, reinforcing fibers may be glass, carbon, or any other material known to be used in reinforcing thermoplastic materials. The stiffness is a function of the materials used (see the plastic comparison above), the fibers used (e glass is a commercial grade glass with more elongation, s glass is more of an aerospace glass that is stiffer, and carbon is the aerospace material of choice because it is very stiff), and the orientation of the fibers to the force being applied (if all the fibers are in the 0° direction and you put force in the 90° direction, the part will not have any strength, but in the 0° direction is will be very stiff and strong). In comparison to previously used materials cork is pretty average in terms of weight. A honeycomb structure is typically much lighter as the cells are hollow. Foams can be lighter or heavier than cork. Buoyancy is based on the density of the cork used.

In one aspect, the process forming of a composite sandwich that can make the skin of a hollow part much stiffer (just like any traditional composite sandwich part). The marriage of the comingled thermoplastic composite cloth (plastic and glass fibers woven into cloth) and a cork core is a very unique sandwich. The thickness and orientation of the composite thermoplastic skins, as well as the thickness of the cork core material determine the final properties of the sandwich. Also, the molding process as described herein should not cause delamination of the materials or final composite product.

In one embodiment, one or more sheets of thermoplastic material are then placed in a facing relationship on the cork sheet. The thermoplastic material may optionally be provided with reinforcement as described above. Heat is then applied to the thermoplastic material sufficient to raise the temperature above the forming temperature of the plastic. This will cause the thermoplastic material to form to the shape of the mold, as well as to partially melt into the surface of the cork sheet to create a mechanical bond between the cork and the thermoplastic sheet. The resulting thermoplastic composite material has enhanced strength and insulation properties. Additionally, the mechanical bond between the cork and the thermoplastic layers will prevent delamination. Further, reinforcing fibers may be added between layers of thermoplastic material when the various components are placed on the molding surface and incorporated into the composite product during a single heating step.

It is also contemplated that in the forming of the composite material as described above, a vacuum may be drawn through the mold to pull the cork and thermoplastic material onto the mold to ensure that the material attains the shape of the mold. Additionally, alone or in combination with the vacuum, pressure may applied from the surface of the sandwich of materials facing away from the mold. The pressure may, for example, be from a mating surface complementary to the surface of the mold.

It is also contemplated that a composite sandwich with a cork core may be formed. For example, one or more thermoplastic sheets may be placed on the molding surface. As discussed herein, the thermoplastic sheets may be reinforced sheets. Alternatively, a thermoplastic sheet may be placed on the molding surface, followed by reinforcing fibers or materials, followed by additional thermoplastic sheets. Next, a sheet of cork material is placed on the thermoplastic material in a facing relationship. Additional thermoplastic sheets, with or with reinforcing material, is then placed on the opposite side of the cork material. Heat is then applied from one or both outer surfaces of the thermoplastic materials to raise the temperature of the thermoplastic material above its forming temperature. By doing so, the thermoplastic material will form to the shape of the mold and melt into the surfaces of the cork facing the thermoplastic material forming mechanical bonds with the cork. The composite sandwich with the cork core has enhanced strength, flexibility, and durability. Additionally, the mechanical bonds between the thermoplastics and the cork decrease the likelihood of delamination.

Additionally, in the formation of the composite sandwich, pressure and or a vacuum may be used to force the structure into the mold to ensure the structure attains the shape of the mold. One or more composite sandwiches having a three dimensional structure may be joined to form a hollow part. Alternatively, a single hollow structure may be formed, for example, using a method as described in co-pending provisional application U.S. Ser. No. 61/261,193. For example, in the formation of the hollow structure, a thermoplastic material is placed on a first mold, followed by a cork sheet, followed by a second sheet of thermoplastic material. A similar arrangement is then provided on a second mold, with a sheet of thermoplastic material placed on a mold, followed by a cork sheet and then a second sheet of thermoplastic material. As the two molds are facing each other, a bladder may be placed between the two outermost sheets of thermoplastic material. The molds are then heated above the forming temperature of the thermoplastic material. Alternatively, or in combination, the bladder may be filled with a heated material. By filling the bladder, the sheets are forced onto the shape of the mold. Alternatively, a vacuum may be drawn to pull composite material onto the mold. Once cooled, the composite structure will have a hollow three dimensional shape.

Alternatives to above example may include a hollow structure with thermoplastic material only on the outer surface and cork facing the hollow center. In this example the second sheets of thermoplastic material would not be placed when laying up the structure prior to applying heat. A further alternative would include a hollow structure with thermoplastic material only on the inner surface. In this example, cork would be in direct contact with the mold and only the "second" sheets would be place during the laying up of the structure prior to applying heat.

A further structure that is considered is an egg-crate shaped sheet. The shape of this structure or similar three dimensional structure without a cork core is very strong, but is even further strengthened by incorporating the cork material. The flexibility of the cork allows the formation of this structure where other core materials may not. The comingled composite thermoplastic cloth is flexible in the cloth form (prior to forming) and can be shaped dry to a 3D mold shape and then heated and formed to shape.

Finishes may be applied to the thermoplastic composites and are independent of the application of the sandwich. For example, sublimation may be used to embed ink into the top layer of the thermoplastic composite. This creates a very marketable translucent look. It is sharp enough to do colors and larger graphics. Logos and small print can be achieved by ironing in sublimation graphics to the finished part similar to t-shirts or using in-mold graphics such as those offered by Mold-In Graphics. There are coatings available, but they may not be aesthetically pleasing. It can be rather difficult to apply or mold a class-A finish to thermoplastic composites, which can limit their usefulness in applications such as automobile body panels.

Figure 10:
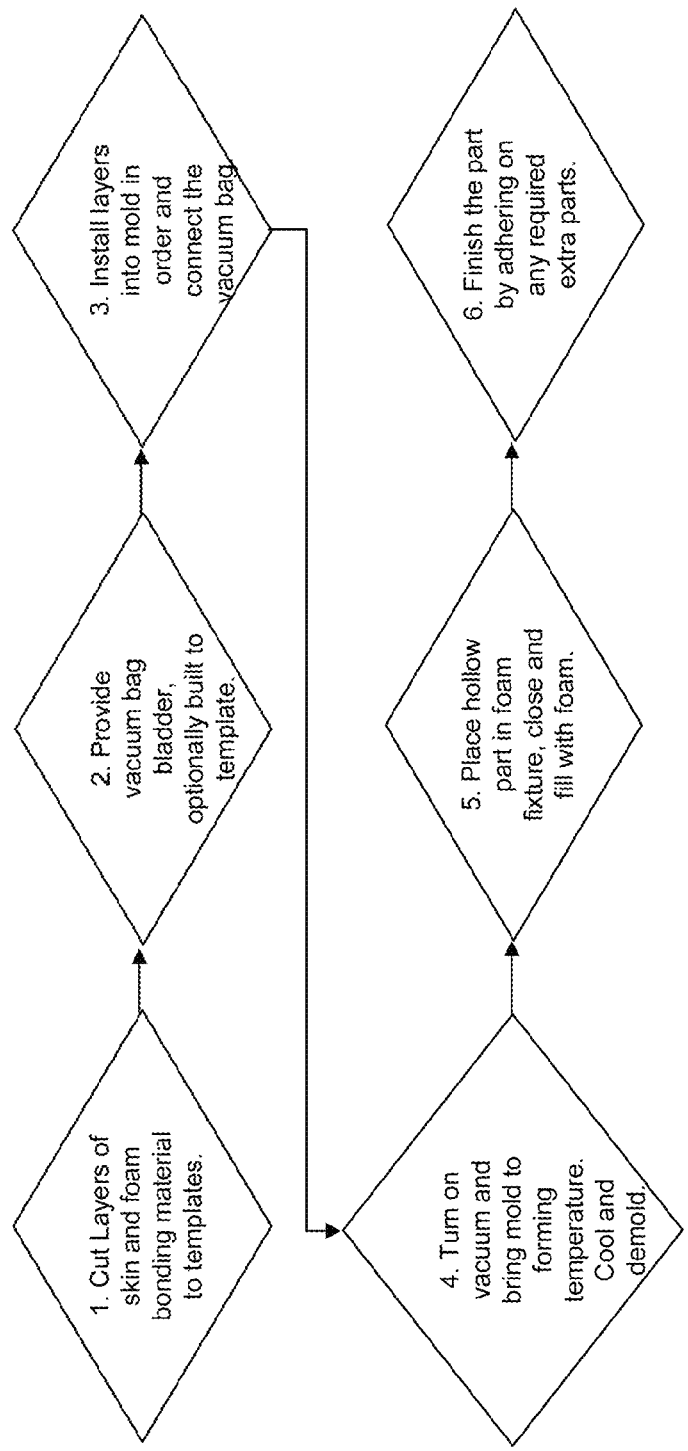
FIG. 10 is a diagram of steps used in the formation of filled thermoplastic composite component.

Turning now to a method useful for forming hollow composite components for reinforced thermoplastic sheeting, set forth in the exemplary diagram of FIG. 10, a foam bonding material is used to line the hollow components. After forming the hollow component, foam or other such fillers can be injected into the hollow component to form a filled composite component. Advantageously, the foam bonding material can provide for improved adhesion and reduced delamination as compared to if the foam were attempted to be adhered directly to the reinforced thermoplastic sheeting. This is because the intermediate foam bonding material can result in a strong bond with both the thermoplastic sheeting and the foam, particularly when the bond is at least partially mechanical as is the case when the bonding material has sufficient porosity. A suitable foam bonding material is the cork materials described herein. Other suitable foam bonding materials can include paper. The reinforced thermoplastic sheeting may be of the type described herein.

A first step (1) for forming the filled composite component can include cutting the layers of the thermoplastic sheeting and foam bonding material to size, such as by using templates. An optional vacuum bladder bag can be provided as a second step (2), such as those described above, can be used to apply heat and pressure to the layers to conform them to the mold. The layers and the vacuum bag can be placed in a mold cavity as a third step (3). In the case of a mold cavity defined by two parts, a first outer layer of sheeting and a first adjacent inner layer of foam bonding material can be provided for forming against one of the mold parts, and a second outer layer of sheeting and a second adjacent inner layer of foam bonding material can be provided for forming against the other of the mold parts. The vacuum bladder bag can be therebetween. Next, in a fourth step (4) the mold can be closed, a vacuum drawn and the bladder filled with a heated fluid to use a combination of pressure, vacuum and heat to form the thermoplastic sheeting and adjacent foam bonding layer against the respective mold parts. During this step, the thermoplastic sheeting can partially melt into the adjacent foam bonding layer to form a mechanical bond. After cooling, the hollow part can be removed from the mold cavity, placed in a foaming fixture and filled with foam as a fifth step (5). The hollow part can be heated to facilitate filling with foam. The hollow part can also be inclined to assist in filling with foam. The foaming fixture could alternatively be the same mold used to form the hollow part. The foam fixture is designed to limit or prevent deformation of the hollow part during the filling with pressurized foam. The foam preferably extends into the foam bonding layers, resulting in a mechanical bond therebetween. Finally, after removal from the foam fixture, as a sixth step (6), the now-filled hollow part can have finishes applied, such as graphics, coatings, paint, or attachment of external parts.

The joining of the first and second layers of thermoplastic can advantageously be accomplished in-mold. For example, the foam bonding layers can be sized less than the size of the thermoplastic layers, such that the peripheral edges of the thermoplastic layers protrude but are still within the mold cavity. The adjacent peripheral portions of the first and second thermoplastic layers can then fuse with each other during the forming process to form a strong, visually appealing seam. Alternatively, an adhesive, such as a polyurethane-based adhesive, can be used to bond peripheral portions of the thermoplastic sheeting of the first and second layers so that a hollow part results.

The finished filled composite component 10 has an outer layer 12 of thermoplastic material, an inner layer of cork 14, and is filled with foam 16, as depicted in FIG. 11. The use of the porous cork layers advantageously results in a mechanical bond between the thermoplastic and the cork layers, and between the cork and the foam, as illustrated in the representative image in FIG. 12. This can be stronger than a bond between just the thermoplastic layer and the foam alone. For example, rotomolding technologies can add oxidizers to the thermoplastic to improve bonding with the foam. However, such parts can delaminate over time during use.

It will be understood that various changes in the details, materials, and arrangements of the parts and components that have been described and illustrated in order to explain the nature of the invention as claimed may be made by those skilled in the art within the principle and scope of the invention.

The invention claimed is:
1. A method of forming a multi-dimensional reinforced composite structure, the method comprising:

positioning a first layer of one or more sheets of flexible reinforced thermoplastic against a first mold;
positioning a first layer of a porous material against the first layer of sheets of reinforced thermoplastic;
positioning an inflatable bladder against the first layer of porous material;
positioning a second layer of porous material against the inflatable bladder;
positioning a second layer of one or more sheets of flexible reinforced thermoplastic against the second layer of porous material and on an opposite side thereof from the inflatable bladder;
forming a common mold cavity using the first mold and a second mold with the first and second layers of flexible reinforced thermoplastic, the first and second layers of porous material, and the inflatable bladder therebetween;
applying forming forces of heat, pressure and vacuum to the first layer of sheets and the second layer of sheets to urge the first layer of sheets of reinforced thermoplastic against the first mold, the first layer of porous material against the first layer of sheets with uniform pressure, the second layer of sheets of reinforced thermoplastic against the second mold, and the second layer of porous material away from the first layer of porous material and against the second layer of sheets with uniform pressure to form the reinforced composite structure having a hollow interior with the first and second layers of porous material facing each other, the forming forces causing the first layer of sheets to form to the shape of the first mold and mechanically bond with the first layer of porous material by partially melting into the first layer of porous material and the second layer of sheets to form the shape of the second mold and mechanically bond with the second layer of porous material by partially melting into the second layer of porous material.

2. The method of claim 1, wherein at least one of the first sheet of flexible reinforced thermoplastic and the second sheet of flexible reinforced thermoplastic includes multiple layers of sub-sheets.

3. The method of claim 2, wherein the first sheet of flexible reinforced thermoplastic and the second sheet of flexible reinforced thermoplastic each includes one of polypropylene, polyethylene, and polyethylene terephthalate comingled with reinforcing fibers.

4. The method of claim 3, wherein the step of applying heat, pressure and vacuum further includes the step of drawing a vacuum through the first and second layers of porous material to draw the adjacent sheet of flexible reinforced thermoplastic and the first and second layers of porous material toward the adjacent mold.

5. The method of claim 1, wherein the step of applying heat, pressure and vacuum further includes means for urging the first sheet of flexible reinforced thermoplastic and the first layer of porous material toward the first mold and for urging the second sheet of flexible reinforced thermoplastic and the second layer of porous material toward the second mold.

6. The method of claim 4, wherein the step of applying heat, pressure and vacuum further includes the step of filling the bladder with a heated fluid to urge the first sheet of flexible reinforced thermoplastic and the first layer of porous material toward the first mold and the second sheet of flexible reinforced thermoplastic and the second layer of porous material toward the second mold.

7. The method of claim 6, further including the step of removing the heated fluid from the bladder after urging the first sheet of flexible reinforced thermoplastic and the first layer of porous material toward the first mold and the second sheet of flexible reinforced thermoplastic and the second layer of porous material toward the second mold and then filling the bladder with a cooling fluid.

8. The method of claim 1, wherein the first and second layers of porous material are cork.

9. The method of claim 1, further including the step of joining peripheral edges of the first and second layers of flexible reinforced thermoplastic within the mold cavity.

10. The method of claim 9, further including the step of filling the hollow part with foam and mechanically bonding the foam to the first and second layers of porous material.

11. A method of forming a filled, multi-dimensional reinforced composite sandwich structure, the method comprising:
positioning a first layer of one or more sheets of flexible reinforced thermoplastic against a first mold side;
positioning a first foam bonding layer against the first layer of sheets of reinforced thermoplastic;
positioning a second foam bonding layer over the first foam bonding layer;
positioning a second layer of one or more sheets of flexible reinforced thermoplastic against the second foam bonding layer;
moving one or both of the first mold side and a second mold side together to form a mold cavity with the first and second layers of flexible reinforced thermoplastic and first and second foam bonding layers therebetween;
applying forming forces of at least one of heat, pressure and vacuum to the first and second layers of flexible reinforced thermoplastic and the first and second foam bonding layers to urge the first layer of reinforced thermoplastic and the first foam bonding layer toward the first mold side and the second layer of reinforced thermoplastic and the second foam bonding layer toward the second mold side, the forming forces causing the first layer of flexible reinforced thermoplastic to form to the shape of the first mold side and mechanically bond with the first foam bonding layer and the second layer of flexible reinforced thermoplastic to form the shape of the second mold side and mechanically bond with the second foam bonding layer and having a hollow interior with the first and second layers of foam bonding material facing each other;
joining peripheral edges of the first and second layers of flexible reinforced thermoplastic to form a hollow composite structure; and
filling the hollow composite structure with a foam, the foam forming a mechanical bond with the first and second foam bonding layers.

12. The method of claim 11, wherein the first and second foam bonding layers comprise cork.

13. The method of claim 12, wherein the step of applying heat and pressure further includes the step of drawing a vacuum through the first and second layers of cork to draw the adjacent first and second sheets of flexible reinforced thermoplastic and the cork layers toward the adjacent mold sides.

14. The method of claim 13, wherein the step of applying heat and pressure further includes the step of filling a bladder with a heated fluid to urge the first and second sheets of flexible reinforced thermoplastic and the first and second layers of cork toward the adjacent first and second mold sides, the bladder being disposed between the first and second cork layers.

15. The method of claim 14, wherein the step of joining peripheral edges of the first and second layers of flexible reinforced thermoplastic includes positioning the peripheral edges within the mold cavity and joining the peripheral edges together during the step of applying forming forces.

16. The method of claim 1, wherein the first and second layers of porous material each have a density of between 100 and 150 kg/m$^3$.

17. The method of claim 1, wherein the first and second layers of porous material each have a density of between 150 and 250 kg/m$^3$.

* * * * *